United States Patent
Ng et al.

(10) Patent No.: US 8,628,183 B2
(45) Date of Patent: Jan. 14, 2014

(54) INK COATING COMPOSITION

(75) Inventors: Hou T. Ng, Campbell, CA (US); Wenjia Zhang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 383 days.

(21) Appl. No.: 13/028,196

(22) Filed: Feb. 15, 2011

(65) Prior Publication Data

US 2012/0206533 A1  Aug. 16, 2012

(51) Int. Cl.
  *B41J 2/01* (2006.01)
(52) U.S. Cl.
  USPC .............................. 347/100; 347/101; 347/96
(58) Field of Classification Search
  USPC ........... 347/100, 95, 96, 101, 102, 88, 99, 21, 347/20, 105; 106/31.27, 31.6, 31.13; 523/160, 161; 428/195, 32.1
  See application file for complete search history.

(56) References Cited

U.S. PATENT DOCUMENTS

| | | | |
|---|---|---|---|
| 4,627,876 A | 12/1986 | Fries et al. | |
| 5,198,024 A | 3/1993 | Tuovinen et al. | |
| 5,451,460 A * | 9/1995 | Lu et al. .......................... | 428/349 |
| 5,801,135 A | 9/1998 | Miyauchi et al. | |
| 5,885,413 A * | 3/1999 | Richmann et al. ................. | 162/5 |
| 7,592,434 B2 | 9/2009 | Kerovuo et al. | |
| 7,608,312 B1 * | 10/2009 | Edlein et al. .................. | 428/35.7 |
| 2003/0222964 A1* | 12/2003 | Brignone et al. ............. | 347/105 |
| 2005/0137282 A1 | 6/2005 | Cagle et al. | |
| 2005/0237369 A1 | 10/2005 | Kosaka | |
| 2007/0276068 A1* | 11/2007 | Hintzer et al. ................. | 524/284 |
| 2009/0130313 A1 | 5/2009 | Ohshima et al. | |
| 2009/0165967 A1 | 7/2009 | Rosencrance et al. | |
| 2009/0170980 A1* | 7/2009 | Ghyzel ........................... | 524/27 |
| 2009/0186162 A1 | 7/2009 | Namba et al. | |
| 2010/0173079 A1 | 7/2010 | Akiyama et al. | |
| 2010/0175584 A1 | 7/2010 | Kusaka et al. | |
| 2010/0180795 A1 | 7/2010 | Ezaki et al. | |

FOREIGN PATENT DOCUMENTS

| | | |
|---|---|---|
| EP | 0307024 | 3/1989 |
| JP | 07-084395 | 3/1995 |
| JP | 2000-214623 | 8/2000 |
| WO | WO 92/20750 | 11/1992 |
| WO | WO 02/094973 | 11/2002 |

OTHER PUBLICATIONS

Gecol, H., et al., "Use of Surfactants to Remove Solvent-Based Inks from Plastic Films", Colloid Polym Sci, 2003, 281: 1172-1177.
Gecol, H., et al., "Use of Surfactants to Remove Water Based Inks from Plastic Films", Colloids & Surfaces A: Physicochemical & Engineering Aspects, Science Direct, 2001, 2pg.
Gecol, H., et al., Deinking of Water-Based Ink Printing from Plastic Film Using Nonionic Surfactants, Jrnl. of Surfactants and Detergents, vol. 5, No. 4, 2002, pp. 363-374.
"Indigo Guide to Sapphire Treatment", Indigo, Version 2.0, Sep. 1996.

(Continued)

*Primary Examiner* — Manish S Shah

(57) ABSTRACT

An ink coating composition is disclosed herein. The ink coating composition includes a polymer latex and an adhesion promoting agent. A non-ionic surfactant is also included in the ink coating composition. The non-ionic surfactant has an HLB value ranging from about 6 to about 15. The ink coating composition also includes a balance of water.

20 Claims, 6 Drawing Sheets

(56) References Cited

OTHER PUBLICATIONS

Gleisner, R. and Blankenburg, J., Semiannual Patents Review: Jul. 2002—Dec. 2002. (Research Paper) Progress in Paper Recycling, vol. 12, No. 3, pp. 26-33 [online], May 2003 [retrieved on Mar. 31, 2010]. Retrieved from the Internet: <URL: http://www.fpl.fs.fed.us/documnts/pdf2003/gleis03a.pdf>.

* cited by examiner

INK COATING COMPOSITION

BACKGROUND

The present disclosure relates generally to an ink coating composition.

Recycling processes may be used to regenerate usable cellulose fibers from waste papers. Some recycling processes involve a deinking method, where ink is removed from waste paper pulp. In some cases, the deinking method includes applying deinking chemicals to waste paper, which interact with and remove the inked portions of the paper. Such deinking processes may, in some instances, pose a challenge for the recycling of some digitally inked papers. This may be due, at least in part, to chemical interactions between digital inks and the deinking chemicals traditionally used in deinking methods.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Processes for recycling printed waste papers, in some instances, involve converting the waste paper into a pulp, and then contacting the pulp with deinking chemicals. The deinking chemicals interact with the ink, and then separate the ink from the waste paper. This recycling process has suitably been used for waste papers printed using offset inks, but some challenges may exist for separating and removing digital inks from waste papers. For instance, traditional deinking involves removing ink particulates falling within a size range of about 10 microns to about 100 microns. Some challenges with removing digital ink, particularly digital pigment-based inkjet inks or digital dye-based inkjet inks, include finding a solution to aggregate the pigment particles or the dye molecules into a desired size range, and changing the particles/molecules physical properties from being too hydrophilic to more hydrophobic. It has been found that some existing deinking chemicals do not, in some instances, efficiently separate the ink from fibers of a waste paper. It is believed that the challenge(s) is/are due, at least in part, to the material composition and/or properties of the digital ink, which may, in some instances, adversely interact, or not at all, with the deinking chemicals used by the recycling mill. In many cases, the digital ink cannot be separated and removed from the waste paper to an extent required for adequate waste paper recycling.

Without being bound to any theory, it is believed that digital inks may suitably be separated from waste papers by including, as a coating printed over or under the printed digital ink, examples of the ink coating composition disclosed herein. Deinking component(s) that are incorporated into the ink coating composition may, in some cases, aid in the interaction of the colorants with deinking chemicals that are introduced during a typical deinking process to assist in separating and removing the digital inks from the waste papers. As such, the incorporation of the deinking component(s) into the ink coating composition advantageously allows the deinking of digitally printed waste papers to be accomplished using existing recycling practices with existing recycling mills. Since examples of the present deinking component(s) are incorporated into ink coating compositions that are printed under or over digital inks, the deinking component(s) is/are in close proximity to the colorant particles in the inks or the liquid electrophotographic ink layer(s). This allows the deinking component(s) to favorably interact with the digital ink upon pulping of the waste paper during waste paper recycling.

Figure 1:
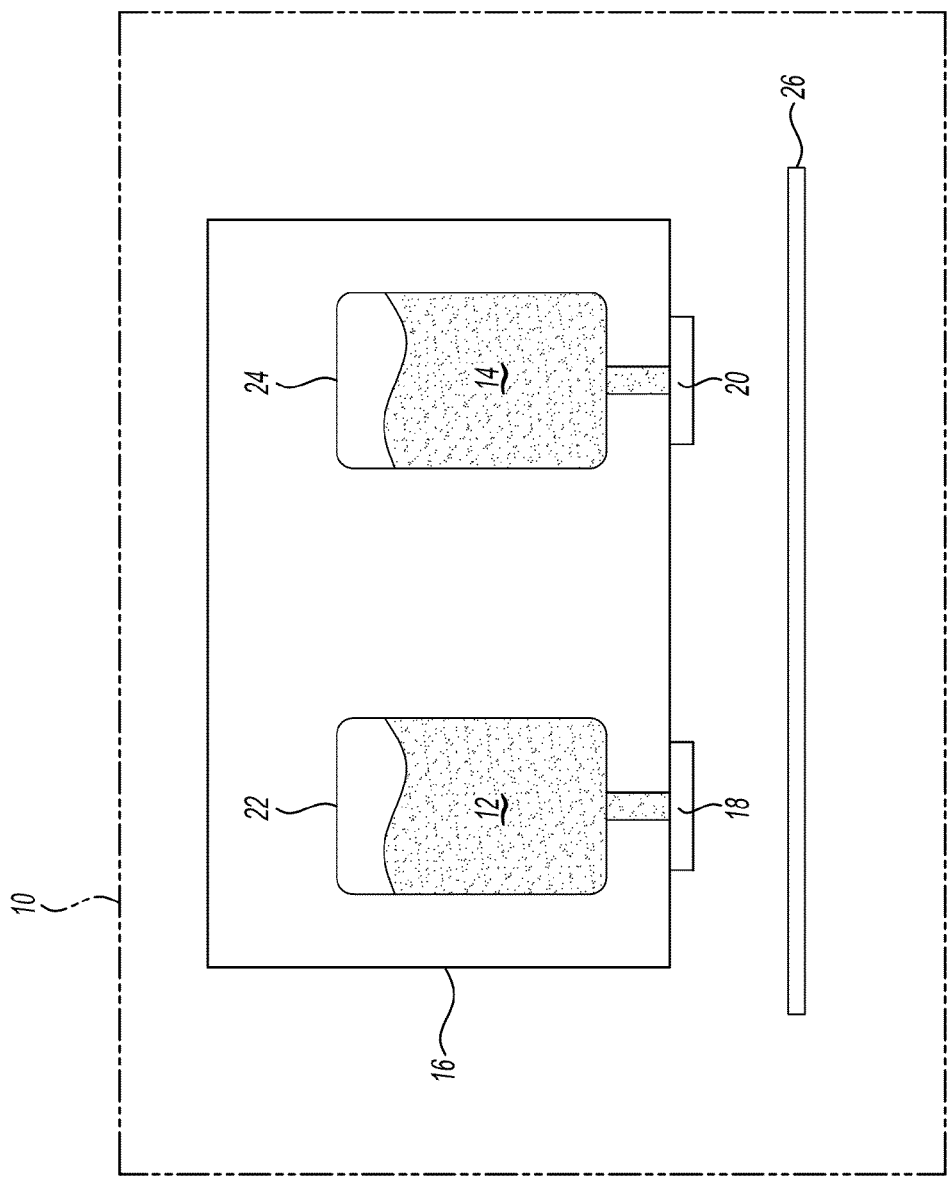
FIG. 1 is a schematic illustration of an example of a printing system that may be used to deposit an example of the ink coating composition disclosed herein.

Referring now to FIG. 1, an example of a printing system 10 that may be used to deposit the digital ink 12 and the ink coating composition 14 disclosed herein is depicted. The printing system 10 includes a printing device 16 (such as, e.g., digital inkjet printers (a continuous device, a drop-on-demand device, a thermal inkjet (TIJ) device, or a piezoelectric inkjet device), electrophotographic printers, or combinations thereof. The printing device 16 has fluid ejectors 18, 20 for dispensing the digital ink 12 and the ink coating composition 14. The fluid ejectors 18, 20 are respectively fluidically coupled to chambers 22, 24 that contain an example of the digital ink 12 and an example of the ink coating composition 14. In one example, the fluid ejectors 18, 20 are respectively configured to eject the digital ink 12 onto a medium 26, and to eject the ink coating composition 14 over the printed digital ink 12 or on the medium 26 prior to the digital ink 12 being dispensed thereon. In another example, the fluid ejectors 18, 20 are respectively configured to eject the digital ink 12 onto an electrophotographic drum, and to eject the ink coating composition 14 over the printed digital ink 12 or on the electrophotographic drum prior to the digital ink 12 being dispensed thereon. In this example, both the printed digital ink 12 and the printed ink coating composition 14 are ultimately transferred to the medium 26. In still other instances, the ink coating composition 14 may be deposited via roll-coating or spray coating techniques.

The digital ink 12 and ink coating composition 14 are retrieved from respective ink chambers 22, 24 during printing.

The printing device 12 may also include additional fluid ejectors (not shown in FIG. 1), where each additional fluid ejector is respectively fluidically coupled to at least one other chamber (also not shown in FIG. 1). For example, the printing system 10 may include an ink set having two or more inks, each of which is stored in a respective ink chamber. The ink chambers may be in fluid communication with a single fluid ejector, or may be in fluid communication with their own respective fluid ejectors.

The digital ink 12 is a liquid composition, a solid composition, or a composition having a phase that is between a liquid and a solid (e.g., a paste), where any of the inks are printable via the digital printing system 10. It is to be understood, however, that the digital ink may also or otherwise be an electrophotographic ink, pigment-based inkjet inks, dye-based inkjet inks, pigment/dye-based inks, traditional offset inks, dry toners, and/or the like.

The ink coating composition 14 is a water-based dispersion including a polymer latex, an adhesion promoting agent, and a non-ionic surfactant.

The non-ionic surfactant that is selected is a deinking component that is incorporated into the ink coating composition 14 and that effectively interacts with the colorant of the digital ink(s) 12 to suitably separate the colorant from the waste paper during traditional waste paper recycling. In particular, a non-ionic surfactant having a hydrophilic-lipophilic balance (HLB) value falling within a suitable range acts as a displector during the pulping and flotation processes of waste paper recycling. As used herein, the term "displector" refers to a component that functions as i) a dispersant to separate colorant particles from the printed waste paper, and ii) a collector to aggregate certain colorant particles (e.g., molecular dyes, nanometer-sized pigment particles, or the like) to larger particles (e.g., micron-sized pigment particles) during pulping.

Examples of suitable non-ionic surfactants include ethoxylated fatty alcohols represented by the formula $CH_3(CH_2)_m(OCH_2CH_2)_nOH$, where m is an integer ranging from 1 to 18, and n is an integer ranging from 1 to 200. Specific examples of these non-ionic surfactants include polyethylene glycol hexadecyl ether ($C_{16}H_{33}$—$(OCH_2CH_2)_2OH$) (such as BRIJ® 52, commercially available from Croda International Corp., UK), polyethylene glycol dodecyl ether ($C_{12}H_{25}$—$(OCH_2CH_2)_4OH$) (such as BRIJ® 30 P4391, commercially available from Croda International Corp.), polyethylene glycol stearate ($H(OCH_2CH_2)_8$—$OCH_2(CH_2)_{16}CH_3$) (such as MYRJ® 45, commercially available from Atlas Chemical Industries, Inc., Marion, Iowa), polyoxyethylene (10) oleoyl ether ($C_{18}H_{35}$—$(OCH_2CH_2)_{10}OH$) (such as BRIJ® 97, commercially available from Croda International Corp.), polyoxyethylene (20) oleyl ether ($C_{18}H_{35}$—$(OCH_2CH_2)_{20}OH$) (such as BRIJ® 98, commercially available from Croda International Corp.), BRIJ® 700 (commercially available from Croda International Corp.), other related non-ionic surfactants in the BRIJ® series, and combinations thereof. The ethoxylated fatty alcohol may also be an octylphenol having at least one ethylene oxide repeating unit. An example of a suitable octylphenol includes octylphenol ethoxylates (such as TRITON® X-114, TRITON® X-405, TRITON® X-45, and TRITON® X-705, commercially available from The Dow Chemical Co., Midland, Mich.)

In other examples, the non-ionic surfactant may be represented by one of the following formulas: $R_1$—O—$(OR_2)_n$—H, $R_1$—$(OR_2)_n$—OH, or $R_1$—$C_6H_4$—$(OR_2)_n$—OH. In these formulas, $R_1$ may be chosen, for example, from i) a linear or cyclic alkyl group including from 3 to 20 carbon atoms, but not a branched alkyl group, or ii) a substituted or non-substituted alkyl group including from 6 to 18 carbon atoms, or in some instances, including from 12 to 18 carbon atoms. Further, $R_2$ may be chosen from $CH_2CH_2$ or $CH_2CH_2CH_2$. The letter n is an integer chosen from 2 to 100, or in some instances, from 2 to 50. In an example, n may be an integer chosen from 2 to 20.

Some further examples of non-ionic surfactants that may be used as a deinking component in the ink dispersion include decaethylene glycol monododecyl ether, diethylene glycol monodecyl ether, diethylene glycol monohexadecyl ether, diethylene glycol monooctyl ether, diethylene glycol monotetradecyl ether, ethylene glycol monodecyl ether, ethylene glycol monohexadecyl ether, ethylene glycol monooctadecyl ether, ethylene glycol monooctyl ether, heptaethylene glycol monodecyl ether, heptaethylene glycol monododecyl ether, heptaethylene glycol monohexadecyl ether, hexaethylene glycol monodecyl ether, hexaethylene glycol monododecyl ether, hexaethylene glycol monohexadecyl ether, hexaethylene glycol monooctadecyl ether, hexaethylene glycol monotetradecyl ether, octylphenyl polyethylene glycol (such as IGEPAL® CA-630, commercially available from Xiamen Topusing Chemical Co., Ltd., China), nonylphenyl polyethylene glycol (such as NONIDET™ P 40 Substitute, commercially available from Sigma Aldrich, St. Louis, Mo.), octaethylene glycol monodecyl ether, octaethylene glycol monododecyl ether, octaethylene glycol monohexadecyl ether, octaethylene glycol monotetradecyl ether, pentaethylene glycol monodecyl ether, pentaethylene glycol monododecyl ether, pentaethylene glycol monohexadecyl ether, pentaethylene glycol monohexyl ether, pentaethylene glycol monooctadecyl ether, pentaethylene glycol monooctyl ether, pentaethylene glycol monotetradecyl ether, polyoxyethylene (10) tridecyl ether, polyoxyethylene (8) stearate, polyoxyethylene (25) propylene glycol stearate, steareth-100, tetraethylene glycol monodecyl ether, tetraethylene glycol monododecyl ether, tetraethylene glycol monohexadecyl ether, tetraethylene glycol monooctadecyl ether, tetraethylene glycol monooctyl ether, tetraethylene glycol monotetradecyl ether, polyethylene glycol p-(1,1,3,3-tetramethylbutyl)-phenyl ether (TRITON® X-100, commercially available from BASF Corp., Florham Park, N.J.), and combinations thereof.

In still other examples, the non-ionic surfactant may be chosen from a diester having at least one ethylene oxide repeating unit. The diester may be represented by the formula $CH_3(CH_2)_mCOO(CH_2CH_2O)_nOC(CH_2)_mCH_3$, where m is an integer ranging from 6 to 25, and n is an integer ranging from 5 to 15. Some examples of diesters that may be used include poly(ethylene glycol)distearate, poly(ethylene glycol)palmitate, and/or combinations thereof.

In an example, the ink coating composition 14 may include a single non-ionic surfactant. In another example, the ink coating composition 14 may include a combination of two or more non-ionic surfactants.

As mentioned above, the non-ionic surfactant chosen for ink coating composition 14 has an HLB value falling within a particular range. As used herein, the HLB value refers to the hydrophile-lipophile balance of a molecule, where the value tends to increase with increasing hydrophilicity. The HLB value of the non-ionic surfactant may be calculated using methods disclosed in e.g., Griffin, W. C., "Classification of Surface-Active Agents by HLB", Journal of the Society of Cosmetic Chemists 1 (1949), pg. 311 and Griffin, W. C., "Calculation of HLB Values of Nonionic Surfactants", Journal of the Society of Cosmetic Chemists 5 (1954), pg. 259, the relevant contents of which are incorporated herein by reference. In an example, the non-ionic surfactant(s) have an HLB value ranging from about 6 to about 15. In another example, the non-ionic surfactant(s) have an HLB value ranging from about 8 to about 13.

The non-ionic surfactant(s) is/are present in the ink coating composition in an amount ranging from about 0.1 wt % to about 50 wt % with respect to a total wt % of the ink coating composition.

As previously mentioned, the ink coating composition 14 also includes the polymer latex. The polymer latex may be in the form of latex nanoparticles. Some examples of suitable polymer latexes include acrylonitrile butadiene styrene, acrylic polymers, polyvinyl acetate, polystyrene butadiene, and/or combinations thereof. In an example, the polymer latex is present in the ink coating composition 14 is an amount ranging from about 1 wt % to about 15 wt % with respect to the total wt % of the ink coating composition 14. In another example, the polymer latex is present in the ink coating composition 14 is an amount ranging from about 3 wt % to about 6 wt % with respect to the total wt % of the ink coating composition 14.

The ink coating composition 14 also includes the adhesion promoting agent. Examples of suitable adhesion promoting agents include polymer based adhesion promoters, such as polyethyleneimines and polyvinyl alcohols. One example of the adhesion promoting agent is a SAPPHIRE™ solution (available from HP Indigo), which in one example, contains POLYMIN® P (manufactured by BASF Corp.) 50% in water and de-ionized water. In an example, the amount of the adhesion promoting agent ranges from about 1 wt % to about 5 wt % with respect to the total wt % of the ink coating composition 14.

For the examples of the ink coating composition 14 disclosed herein, in an example, water alone is used as the solvent. As such, in one example, water makes up the balance of the ink coating composition 14. In another example, the ink coating composition 14 includes water and a co-solvent chosen from 1,2-hexanediol, 2-pyrrolidinone, di-(2-hydroxyethyl)-5,5-dimethylhydantoin (such as DANTOCOL® DHE, commercially available from Lonza Inc., Allendale, N.J.), and combinations thereof. In an example, the total amount of co-solvent ranges from about 0.1 wt % to about 30 wt % of a total wt % of the ink coating composition 14. In another example, the total amount of co-solvent ranges from about 0.5 wt % to about 10 wt %. Co-solvent(s) may be desirable, for example, when the ink coating composition 14 is to be used with inkjet printing.

In some examples, the ink coating composition 14 may include an additive such as, e.g., a biocide (e.g., BIOBAN™, available from The Dow Chemical Co., Midland, Mich.). In one example, the ink coating composition 14 includes the biocide present in an amount ranging from about 0.01 wt % to about 0.2 wt % of a total weight percent of the ink coating composition 14.

In an example of making the ink coating composition 14 disclosed herein, the various components are mixed together in the desired amounts. It is believed that the non-ionic surfactant becomes interlocked with the polymer latex during formation of the ink coating composition 14.

Figure 2:
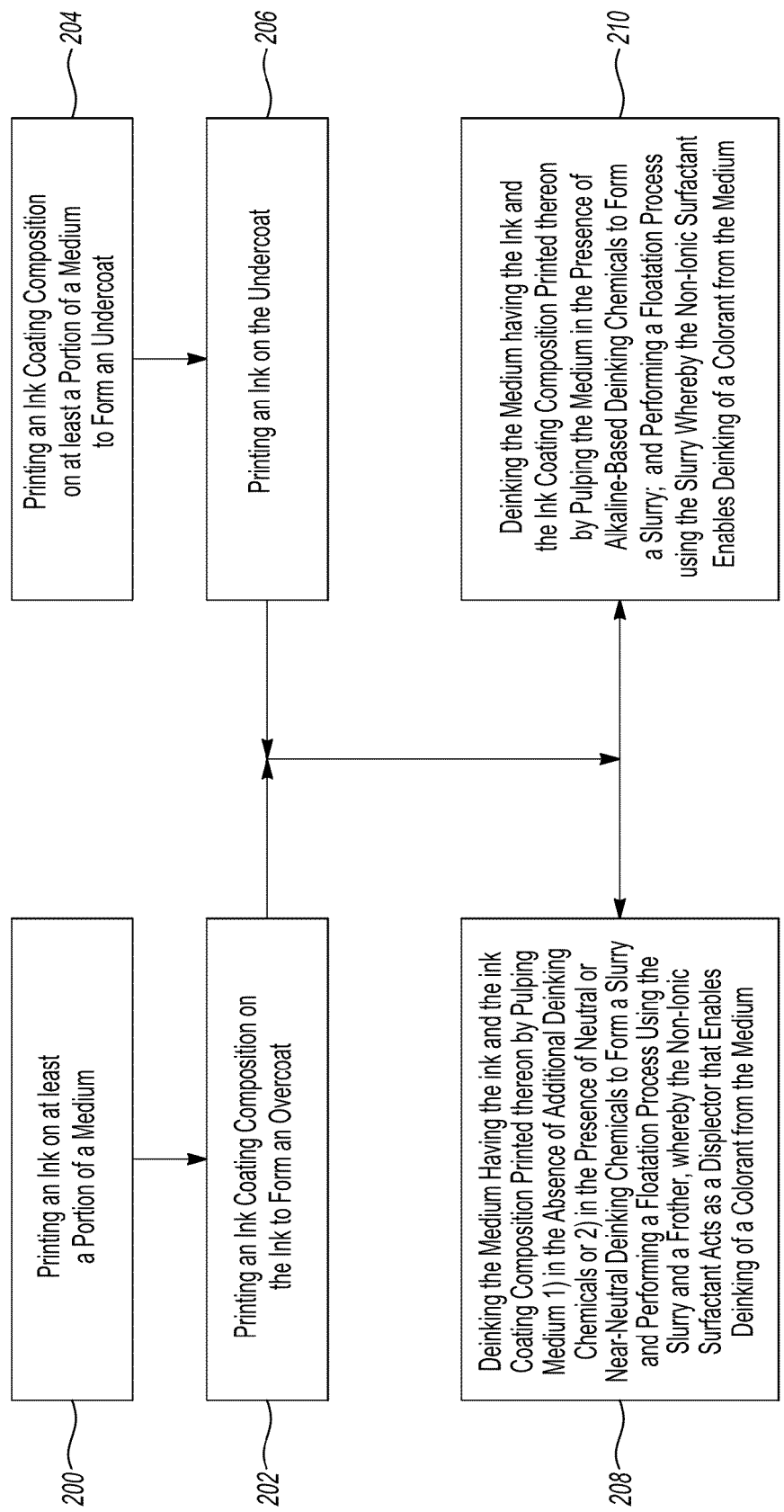
FIG. 2 is a flow diagram depicting examples of a method of deinking a printed medium.

Referring now to FIG. 2, examples of the printing and deinking methods are illustrated. It is believed that the ink coating composition 14 may be used over or under the printed digital ink 12 regardless of the deinking process that will ultimately be used for recycling. This is due, at least in part, to the non-ionic surfactant(s) performing effectively to achieve deinkability of digital printed media in a variety of deinking processes, including neutral and near-neutral processes (i.e., having a pH ranging from about 7 to about 8) and alkaline-based processes.

The printing portions of the methods shown in FIG. 2 are labeled at reference numerals 200 and 202 or at reference numerals 204 and 206. In one example, the digital ink 12 is printed on the medium 26 (reference numeral 200), and then the ink coating composition 14 is printed over the printed digital ink 12 (reference numeral 202). In these instances, the ink coating composition 14 is an overcoat. In another example, the ink coating composition 14 is printed on the medium 26 first to form an undercoat (reference numeral 204), and then the digital ink 12 printed on the undercoat (reference numeral 206). It is to be understood that the actual printing mode/method may vary depending upon the printing system 10 used (e.g., the ink 12 and/or composition 14 may be printed on drum(s) and/or other equipment before being transferred to the medium 26.

The medium 26 may take the form of a media sheet or of a continuous web suitable for printing via the printing system depicted, e.g., in FIG. 1. The medium 26 may be a base paper manufactured from cellulose fibers. In an example, the base paper may be produced from chemical pulp, mechanical pulp, thermal mechanical pulp, and/or combinations thereof. In some cases, the base paper may also include additives such as internal sizing agents and fillers. The internal agents may be added to the pulp before the pulp is converted into a paper web or medium. The fillers may be any type of filler used in paper such as, e.g., calcium carbonate, talc, clay, kaolin, titanium dioxide, and combinations thereof. The base paper may also be uncoated raw paper, or a pre-coated paper. In an example, the paper has a basis weight ranging from about 100 g/m² to about 250 g/m².

Fibers of the medium 26 upon which the ink 12 or ink coating composition 14 is directly deposited to form the printed medium may be recycled using a conventional paper recycling process. For example, the printed medium (having the ink 12 and the ink coating composition 14 thereon) may be placed inside a recycling mill, and then the colorant of the ink 12 deposited on the printed medium may be detached from the fibers of the medium 26 to form a deinked pulp. The detaching of the colorant from the medium 26 may be referred to herein as a deinking process. This deinking process includes introducing the printed medium 26 (having the ink 12 and the ink coating composition 14 thereon) into a pulper of the recycling mill, and then chopping the printed medium up into smaller pieces. In a neutral or near-neutral deinking process (see reference numeral 208), pulping takes place in the presence of neutral or near-neutral deinking chemicals (those chemicals having a pH within the range of about 7 to about 8), or in the absence of additional deinking chemicals. As an example of the neutral or near-neutral process, the pH controlling agent NaOH may not be added. In this deinking process, the non-ionic surfactant acts as a displector (i.e., fulfilling the role of a dispersant and a collector) to separate the ink particles and aggregate smaller ink particles into larger aggregates. In an alkaline-based process (see reference numeral 210), pulping takes place in the presence of alkaline-based deinking chemicals, such as NaOH, a $Na_2SiO_3$ solution, Oleic Acid, and $H_2O_2$. In this deinking process, the non-ionic surfactant also acts as a displector. It is to be understood that during either the neutral/near-neutral or alkaline-based deinking processes, water may be added inside the pulper while the medium is chopped, thereby converting the printed medium into a slurry of pulp and ink.

Regardless of the deinking process used to make the slurry, upon making the slurry, examples of the method of the present disclosure include performing a flotation process, which separates the ink from the slurry.

When a neutral or near-neutral deinking process is used, the slurry is introduced into a froth flotation cell, and then a collector (e.g., a frother) is introduced into the slurry. One example of a suitable frother is sodium dodecyl sulfate. The frother facilitates formation of foam which allows the removal of the detached ink particles from the fibers. More particularly, since the frother has an affinity to the now-detached colorant particles, the colorant particles attach to the frother foam. In an example, air is also blown into the slurry. The air bubbles lift the colorant particles to the surface of the flotation cell as a thick froth, which may be removed from the cell.

When an alkaline-based deinking process is used, the slurry is introduced into a froth flotation cell. The flotation process of this example may take place in the presence or the absence of a frother.

In some instances, the pulp slurry is screened to remove any materials that may be denser than the pulp, such as contaminants or other foreign matter. In an example, coarse and fine screening may be accomplished by passing the slurry over or through a screen with varying slot opening sizes to separate such materials from the slurry, and these materials may be caught using another mesh screen.

To further illustrate the present disclosure, examples are given herein. It is to be understood that these examples are provided for illustrative purposes and are not to be construed as limiting the scope of the disclosed example(s).

EXAMPLES

An example of the ink coating composition was prepared using water and MYRJ® 45. In this particular example, polymer latex and an adhesion promoting agent were not used. This ink coating composition was used as an overcoat. Both LEP print media (ElectroInk on NewPage Indigo paper) and inkjet pigment-based prints (pigment-based inkjet inks on COLORLOK® paper) were coated with the ink coating composition and allowed to dry.

Two deinking evaluations were performed for the LEP print media samples. One deinking evaluation involved an alkaline-based process and the other deinking evaluation involved a near-neutral process. The coated LEP samples were subjected to these deinking processes. One deinking evaluation was performed for the inkjet print media samples. This deinking evaluation involved the alkaline-based process. The coated inkjet samples were subjected to this deinking process. The deinking processes are described below.

Alkaline-Based Process

The alkaline-based deinking followed the protocol as outlined in INGEDE Method 11. The first step of the alkaline-based deinking process involved pulping some of the printed papers in the presence of the INGEDE Method 11 chemicals (i.e., 0.3% NaOH, 0.9% $Na_2SiO_3$ solution, 0.8% Oleic Acid, and 0.7% $H_2O_2$). This was then followed by a flotation process in a flotation cell. No frother was added during the flotation.

Near-Neutral Process

The first step of the near-neutral deinking process involved pulping some of the printed papers in the absence of non-neutral deinking chemicals that would normally be added to the pulping process (e.g., LIONSURF® deinking solution from Kemira). This was then followed by a flotation process in a flotation cell in the presence of a frother (i.e., sodium dodecyl sulfate).

Respective handsheets were made from all of the pulps (those obtained before and after flotation) to evaluate the efficiency of the deinking processes when the ink coating composition disclosed herein was utilized as an overcoat. The sample pulps obtained before flotation are referred to herein as undeinked samples and the sample pulps obtained after flotation are referred to herein as deinked samples.

Tables 1 and 2 show results for the deinked coated LEP and inkjet print media, respectively. It is to be understood that column heading values (e.g., (47, 90) for luminosity) illustrate the threshold value and the target value. It is to be further understood that the second row of data shows the respective scores (using the European Recycling Paper Council's deinking score card) for the samples based upon the results in the first row of data.

TABLE 1

Pulp from LEP Print Media

| Method | Luminosity Y (47, 90) | Color a* ((−3, 2), (−2, 1)) | Ink Elimination IE (40, 80) | Filtrate Darkening ΔY (18, 6) | Dirt Particle A50 (2000, 600) | Dirt Particle A250 (600, 180) | Flotation Yield | EPRC Score |
|---|---|---|---|---|---|---|---|---|
| Alkaline | 90.1 | −0.5 | ~40 | 0.9 | 86 | 36 | 84.67 | 90 |
|  | 35 | 20 | 0 | 10 | 15 | 10 |  |  |
| Neutral | 89.0 | −0.5 | ~40 | 0.7 | 104 | 24 | 77.67 | 89 |
|  | 34 | 20 | 0 | 10 | 15 | 10 |  |  |

TABLE 2

Pulp from Inkjet Print Media

| Method | Luminosity Y (47, 90) | Color a* ((−3, 2), (−2, 1)) | Ink Elimination IE (40, 80) | Filtrate Darkening ΔY (18, 6) | Dirt particle A50 (2000, 600) | Dirt particle A250 (600, 180) | Flotation Yield | EPRC Score |
|---|---|---|---|---|---|---|---|---|
| Alkaline | 76.2 | −0.4 | 44.7 | 12 | 24 | 0 | ~70 | 72.8 |
|  | 24 | 20 | 1 | 2.8 | 15 | 10 |  |  |

Figure 3A:
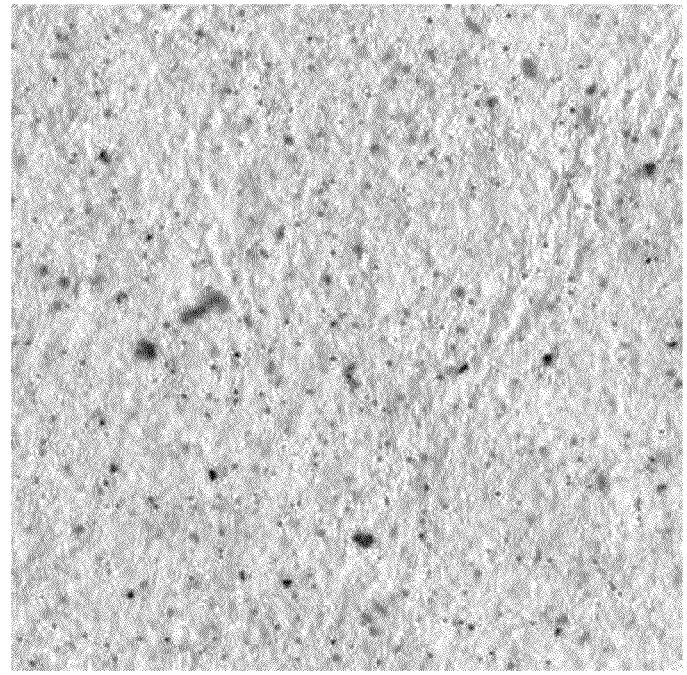
FIGS. 3A and 3B are optical images of handsheets made from non-deinked pulps (FIG. 3A) and deinked pulps exposed to an example alkaline-based deinking process (FIG. 3B), where the pulps are from coated liquid electrophotographic (LEP) print media.
Figure 3B:
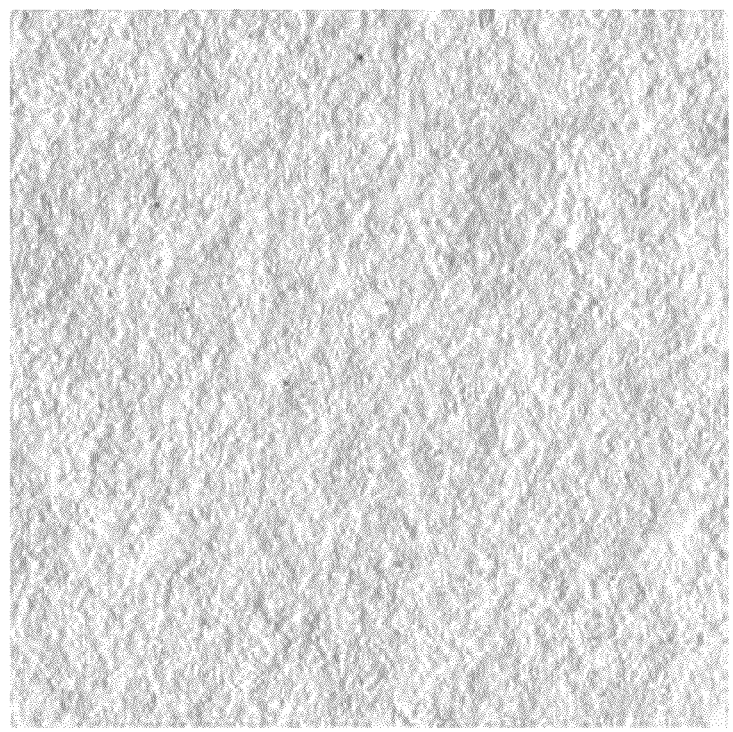
Figure 4A:
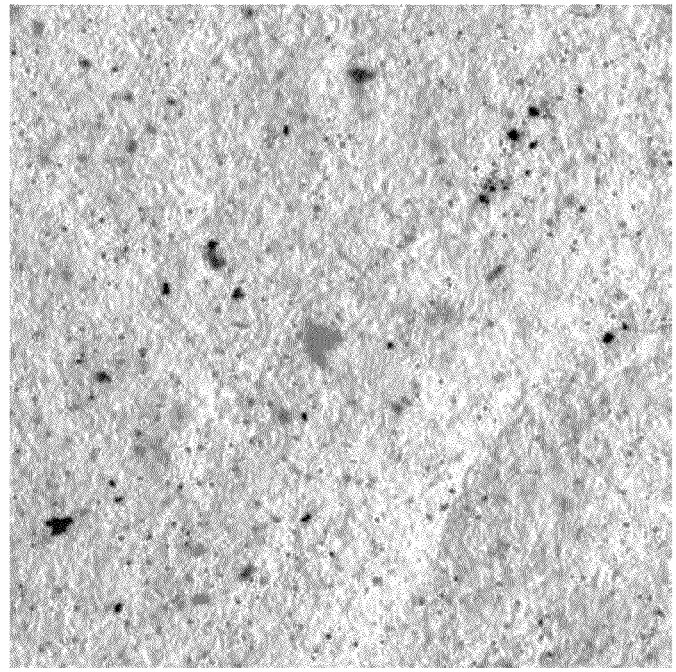
FIGS. 4A and 4B are optical images of handsheets made from non-deinked pulps (FIG. 4A) and deinked pulps exposed to an example near-neutral deinking process (FIG. 4B), where the pulps are from coated liquid electrophotographic (LEP) print media.
Figure 4B:
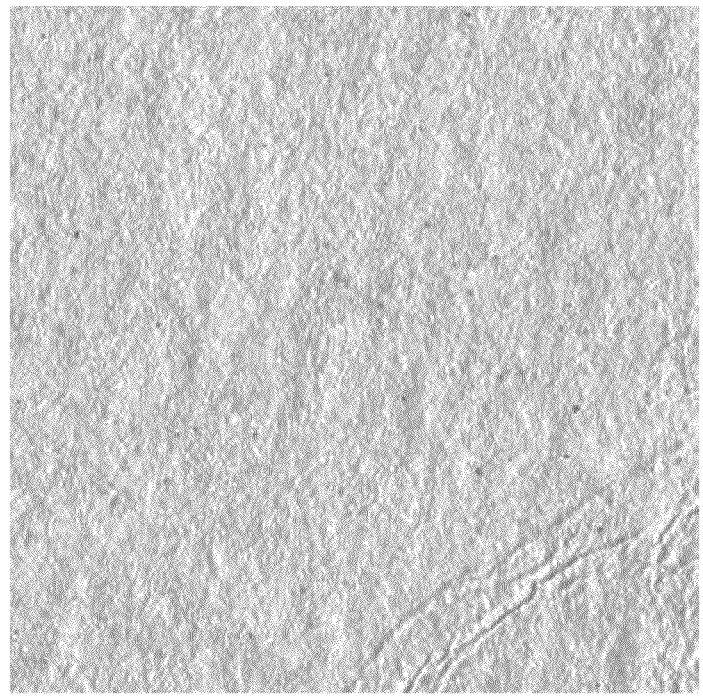

FIGS. 3A, 3B, 4A and 4B show images of the handsheets made from the undeinked pulps (i.e., those that did not undergo flotation) and deinked pulps of the coated LEP print media samples. More particularly, FIGS. 3A and 3B show schematic illustrations of the handsheets made, respectively, from the undeinked and deinked pulps of the coated LEP print media samples that were obtained via the alkaline-based process, and FIGS. 4A and 4B show schematic illustrations of the handsheets made, respectively, from the undeinked and deinked pulps of the coated LEP print media samples that were obtained via the near-neutral process. Table 1 shows the data for the deinked coated LEP samples.

The ink speck counts on the handsheets of the deinked LEP pulps (i.e., those formed from the coated LEP samples exposed to either the alkaline-based process or the near-neutral process) shown in FIGS. 3B and 4B were found to be significantly less than the target level of 600, which is set by the European Recycling Paper Council's deinking score card (where a total score of 70 is considered to be good deinkability). The optical brightness (luminosity) was close to the target level (for high-grade writing paper) of 90%. The filtrate darkening (i.e., an indication of the discoloration of the deinking process water) was less than 1, which was noticeably better than the target level of 6. The color shade was also well within the target range. The ink elimination of the deinked LEP pulps meets the threshold, but it is believed that this can be further improved with optimization of the non-ionic surfactant loading in the ink coating composition. In addition, the fiber yield is around 80%, which is comparable to that of existing deinking processes.

The results for the handsheets formed from the undeinked and deinked pulps of the coated LEP samples illustrate that the coating facilitated good deinkability of LEP inks from the media.

Figure 5A:
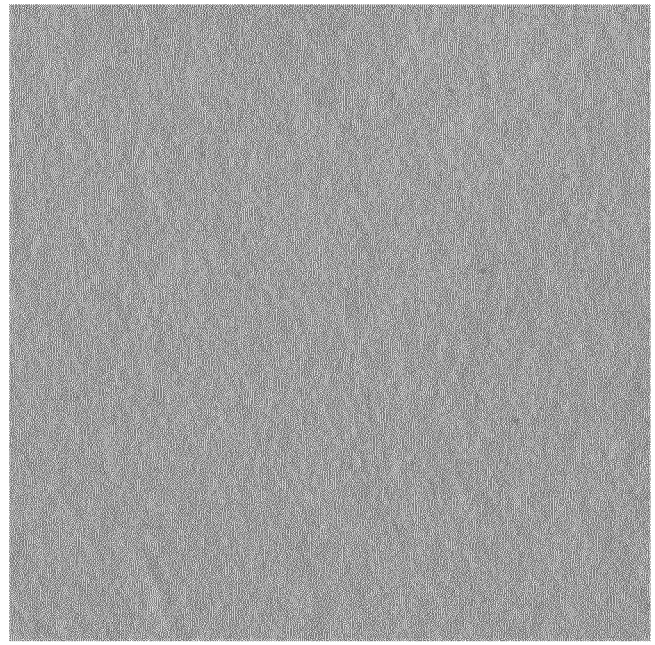
FIGS. 5A and 5B are optical images of handsheets made from non-deinked pulps (FIG. 5A) and deinked pulps exposed to an example alkaline-based deinking process (FIG. 5B), where the pulps are from coated inkjet print media.
Figure 5B:
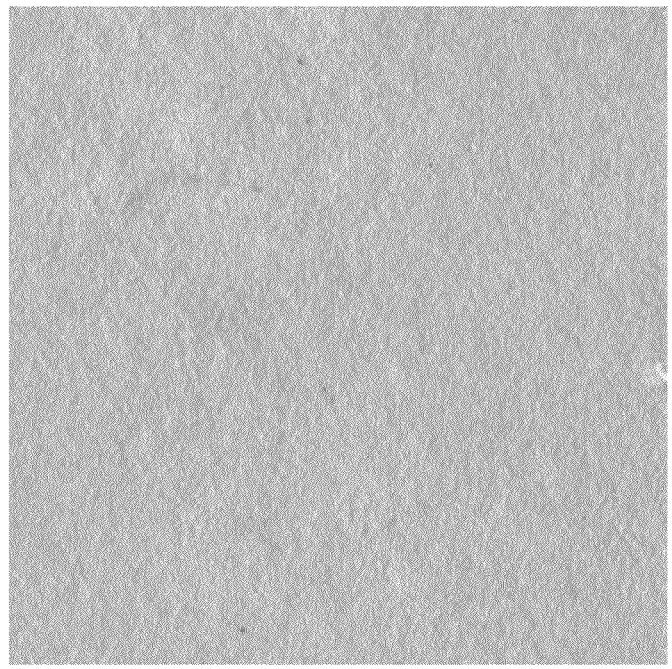
Figure 6A:
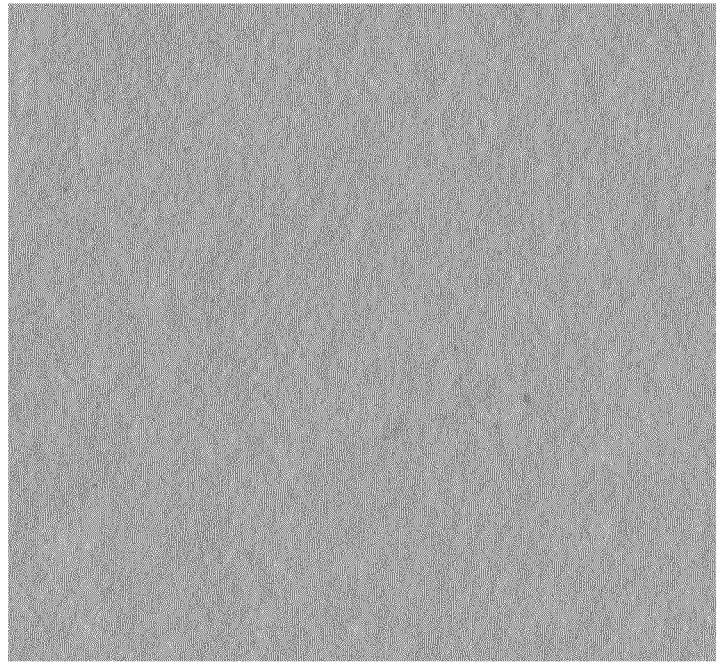
FIGS. 6A and 6B are optical images of handsheets made from non-deinked pulps (FIG. 6A) and deinked pulps exposed to an example near-neutral deinking process (FIG. 6B), where the pulps are from coated inkjet print media.
Figure 6B:
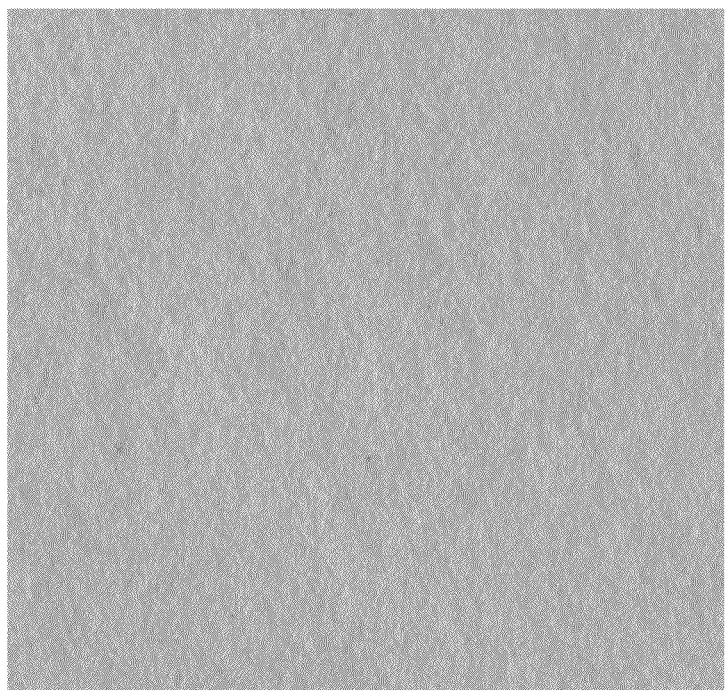

FIGS. 5A, 5B, 6A and 6B show the handsheets made from the undeinked and deinked pulps of the coated inkjet print media samples. More particularly, FIGS. 5A and 5B show images of the handsheets made, respectively, from the undeinked and deinked pulps of the coated inkjet print media samples that were obtained via the alkaline-based process, and FIGS. 6A and 6B show images of the handsheets made, respectively, from the undeinked and deinked pulps of the coated inkjet print media samples that were obtained via the near-neutral process. Table 2 shows the data for the deinked inkjet samples exposed to the alkaline process.

The ink speck counts on the handsheets of the deinked inkjet pulps (i.e., those formed from the coated inkjet samples exposed to the alkaline-based process) shown in FIG. 5B were found to be significantly less than the target level of 600, which is set by the European Recycling Paper Council's deinking score card. The optical brightness was within the acceptable range of 47% to 90%. The filtrate darkening passed (is lower than) the threshold level, and the color shade was well within the target range. The ink elimination of the deinked inkjet pulp exposed to the alkaline-based process passed (is lower than) the threshold level. The dirt particle results were also within the target level.

The results for the handsheets formed from the undeinked and deinked pulps of the coated inkjet samples illustrate that the coating facilitated good deinkability of inkjet inks from the media.

As illustrated in FIGS. 3A through 6B and Tables 1 and 2, effective ink removal of LEP ink was observed using both the near-neutral deinking process and the alkaline-based deinking process for the coated sample pulps, and effective ink removal of inkjet ink was observed using the alkaline-based deinking process for the coated sample pulps. From the results, one can conclude that the ink coating composition disclosed herein effectively enhances deinking.

It is to be understood that the ranges provided herein include the stated range and any value or sub-range within the stated range. For example, a range from about 0.1 wt % to about 30 wt % should be interpreted to include not only the explicitly recited limits of about 0.1 wt % to about 30 wt %, but also to include individual values, such as 0.2 wt %, 5 wt %, 12 wt %, etc., and sub-ranges, such as from about 0.5 wt % to about 10 wt %, from about 3 wt % to about 20 wt %, etc. Furthermore, when "about" is utilized to describe a value, this is meant to encompass minor variations (up to +/−10%) from the stated value.

While several examples have been described in detail, it will be apparent to those skilled in the art that the disclosed examples may be modified. Therefore, the foregoing description is to be considered non-limiting.

What is claimed is:

1. An ink coating composition, consisting of:
   a polymer latex present in an amount ranging from about 1 wt % to about 15 wt % with respect to a total wt % of the ink coating composition;
   an adhesion promoting agent present in an amount ranging from about 1 wt % to about 5 wt % with respect to the total wt % of the ink coating composition;
   a non-ionic surfactant having an HLB value ranging from about 6 to about 15, the non-ionic surfactant being present in an amount ranging from about 0.1 wt % to about 50 wt % with respect to the total wt % of the ink coating composition;
   optionally a biocide; and
   a balance of water.

2. The ink coating composition as defined in claim 1 wherein the non-ionic surfactant is a material represented by $CH_3(CH_2)_m(OCH_2CH_2)_nOH$, where m is an integer ranging from 1 to 18, and n is an integer ranging from 1 to 200.

3. The ink coating composition as defined in claim 2 wherein the non-ionic surfactant is chosen from $C_{16}H_{33}$—$(OCH_2CH_2)_2OH$, $C_{12}H_{25}$—$(OCH_2CH_2)_4OH$, polyethylene glycol stearate, $C_{18}H_{35}$—$(OCH_2CH_2)_{10}OH$, $C_{18}H_{35}$—$(OCH_2CH_2)_{20}OH$, and combinations thereof.

4. The ink coating composition as defined in claim 1 wherein the non-ionic surfactant is i) a material represented by one of the formulas $R_1$—O—$(OR_2)_n$—H, $R_1$—$(OR_2)_n$—OH or $R_1$—$C_6H_4$—$(OR_2)_n$—OH, wherein: $R_1$ is chosen from a) a linear or cyclic alkyl group including from 3 to 20 carbon atoms, or b) a substituted or non-substituted alkyl group including from 6 to 18 carbon atoms, $R_2$ is chosen from $CH_2CH_2$ or $CH_2CH_2CH_2$, and n is an integer chosen from 2 to 100; or ii) a diester having at least one ethylene oxide repeating unit, or iii) an octylphenol having at least one ethylene oxide repeating unit.

5. The ink coating composition as defined in claim 1 wherein the non-ionic surfactant is a displector, and wherein the displector, when combined with a frother from a waste paper recycling system, enables deinking of a colorant from a medium on which the colorant is established.

6. The ink coating composition as defined in claim 1 wherein the adhesion promoting agent is chosen from polyethyleneimines and polyvinyl alcohols.

7. The print medium as defined in claim 1 wherein the non-ionic surfactant is polyethylene glycol stearate.

8. A printing system, comprising:
   a base paper of cellulose fibers; and
   a printing device, including:
      at least one chamber for storing an ink:
      at least one chamber storing an ink coating composition which includes:
         a polymer latex present in an amount ranging from about 1 wt % to about 15 wt % with respect to a total wt % of the ink coating composition;

an adhesion promoting agent present in an amount ranging from about 1 wt % to about 5 wt % with respect to the total wt % of the ink coating composition;

a non-ionic surfactant having an HLB value ranging from about 6 to about 15 present in an amount ranging from about 0.1 wt % to about 50 wt % with respect to the total wt % of the ink coating composition; and a balance of water;

a fluid ejector for depositing the ink onto the base paper; and a fluid ejector for depositing the ink coating composition under or over the ink.

9. The printing system as defined in claim 8 wherein the non-ionic surfactant is a material represented by $CH_3(CH_2)_m(OCH_2CH_2)_nOH$, where m is an integer ranging from 1 to 18, and n is an integer ranging from 1 to 200.

10. The printing system as defined in claim 9 wherein the non-ionic surfactant is chosen from $C_{16}H_{33}-(OCH_2CH_2)_2OH$, $C_{12}H_{25}-(OCH_2CH_2)_4OH$, polyethylene glycol stearate, $C_{18}H_{35}-(OCH_2CH_2)_{10}OH$, $C_{18}H_{35}-(OCH_2CH_2)_{20}OH$, and combinations thereof.

11. The printing system as defined in claim 8 wherein the non-ionic surfactant is i) a material represented by one of the formulas $R_1-O-(OR_2)_n-H$, $R_1-(OR_2)_n-OH$ or $R_1-C_6H_4-(OR_2)_n-OH$, wherein: $R_1$ is chosen from a) a linear or cyclic alkyl group including from 3 to 20 carbon atoms, or b) a substituted or non-substituted alkyl group including from 6 to 18 carbon atoms, $R_2$ is chosen from $CH_2CH_2$ or $CH_2CH_2CH_2$, and n is an integer chosen from 2 to 100; or ii) a diester having at least one ethylene oxide repeating unit, or iii) an octylphenol having at least one ethylene oxide repeating unit.

12. The printing system as defined in claim 8 wherein the ink is chosen from an electrophotographic ink, a pigment-based inkjet ink, a dye-based inkjet ink, a dry toner, and an offset ink.

13. A method, comprising:
printing an ink on at least a portion of a medium, the medium being a base paper of cellulose fibers; and
printing an ink coating composition on the at least the portion of the medium i) prior to printing the ink to form an undercoat for the ink on the medium, or ii) after printing the ink to form an overcoat on the ink, the ink coating composition including:
a polymer latex present in an amount ranging from about 1 wt % to about 15 wt % with respect to a total wt % of the ink coating composition;
an adhesion promoting agent present in an amount ranging from about 1 wt % to about 5 wt % with respect to the total wt % of the ink coating composition;
a linear, non-ionic surfactant having an HLB value ranging from about 6 to about 15, the non-ionic surfactant being present in an amount ranging from about 0.1 wt % to about 50 wt % with respect to the total wt % of the ink coating composition; and
a balance of water.

14. The method as defined in claim 13, further comprising deinking the medium having the ink and the ink coating composition printed thereon by:
pulping the medium having the ink and the ink coating composition printed thereon in the presence of neutral or near-neutral deinking chemicals to form a slurry; and
performing a floatation process using the slurry and a frother;
whereby the non-ionic surfactant acts as a displector that enables deinking of a colorant from the medium.

15. The method as defined in claim 13, further comprising deinking the medium having the ink and the ink coating composition printed thereon by:
pulping the medium having the ink and the ink coating composition printed thereon in the absence of additional deinking chemicals to form a slurry; and
performing a floatation process using the slurry and a frother;
whereby the non-ionic surfactant acts as a displector that enables deinking of a colorant from the medium.

16. The method as defined in claim 13, further comprising deinking the medium having the ink and the ink coating composition printed thereon by:
pulping the medium having the ink and the ink coating composition printed thereon in the presence of alkaline-based deinking chemicals to form a slurry, whereby the non-ionic surfactant enables deinking of a colorant from the medium; and
performing a floatation process using the slurry.

17. The method as defined in claim 16 wherein the floatation process is performed in the absence of a frother.

18. The method as defined in claim 13 wherein the ink coating composition consists of:
the polymer latex;
the adhesion promoting agent;
the linear, non-ionic surfactant;
optionally a biocide; and
the balance of water.

19. A print medium, comprising:
a base paper of cellulose fibers; and
an ink coating composition deposited on the base paper, the ink coating composition including:
a polymer latex present in an amount ranging from about 1 wt % to about 15 wt % with respect to a total wt % of the ink coating composition;
an adhesion promoting agent present in an amount ranging from about 1 wt % to about 5 wt % with respect to the total wt % of the ink coating composition;
a linear, non-ionic surfactant having an HLB value ranging from about 6 to about 15, the linear, non-ionic surfactant being present in an amount ranging from about 0.1 wt % to about 50 wt % with respect to the total wt % of the ink coating composition; and
a balance of water.

20. The print medium as defined in claim 19 wherein the linear, non-ionic surfactant is polyethylene glycol stearate.

* * * * *

UNITED STATES PATENT AND TRADEMARK OFFICE
CERTIFICATE OF CORRECTION

PATENT NO. : 8,628,183 B2
APPLICATION NO. : 13/028196
DATED : January 14, 2014
INVENTOR(S) : Ng et al.

Page 1 of 1

It is certified that error appears in the above-identified patent and that said Letters Patent is hereby corrected as shown below:

In the Claims

Column 10, line 57, claim 7, "The print medium" should be changed to --The ink coating composition--.

Signed and Sealed this
Twenty-seventh Day of May, 2014

Michelle K. Lee
*Deputy Director of the United States Patent and Trademark Office*